H. MADSON.
POTATO SORTER OR SCREENING APPARATUS.
APPLICATION FILED OCT. 26, 1920.

1,430,664.

Patented Oct. 3, 1922.
2 SHEETS—SHEET 1.

Inventor
H. Madson.
By E. E. Vrooman & Co.,
his Attorneys.

H. MADSON.
POTATO SORTER OR SCREENING APPARATUS.
APPLICATION FILED OCT. 26, 1920.
1,430,664.
Patented Oct. 3, 1922.
2 SHEETS—SHEET 2.
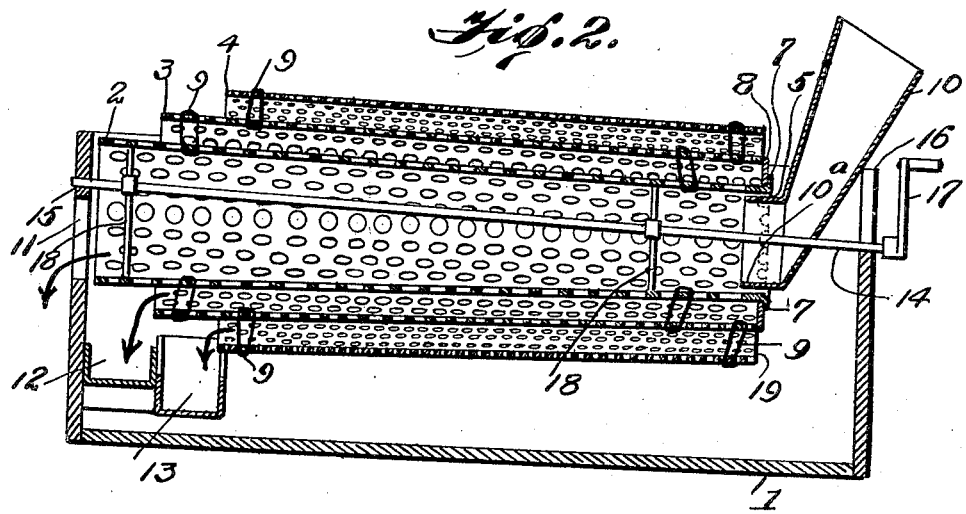
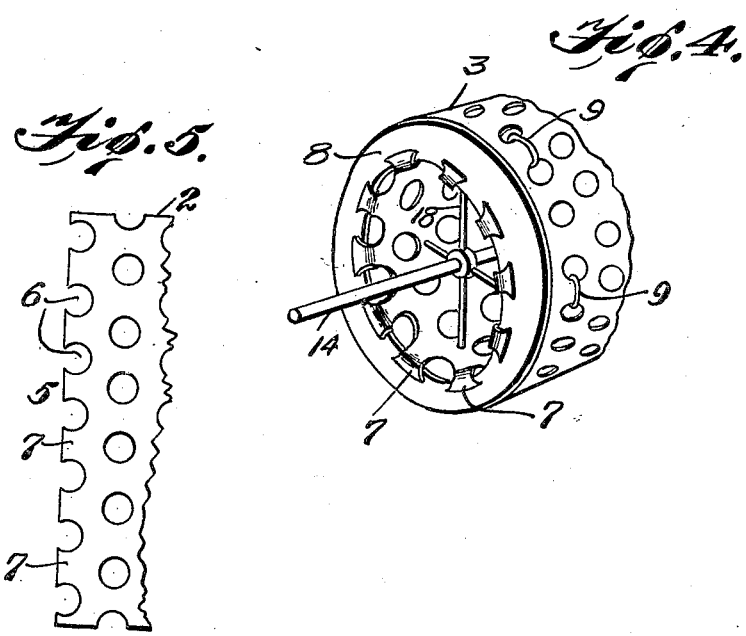
Inventor
H. Madson.

Patented Oct. 3, 1922.

1,430,664

UNITED STATES PATENT OFFICE.

HENRY MADSON, OF PELICAN RAPIDS, MINNESOTA.

POTATO SORTER OR SCREENING APPARATUS.

Application filed October 26, 1920. Serial No. 419,602.

*To all whom it may concern:*

Be it known that I, HENRY MADSON, a citizen of the United States, residing at Pelican Rapids, in the county of Otter Tail and State of Minnesota, have invented certain new and useful Improvements in Potato Sorters or Screening Apparatus, of which the following is a specification, reference being had therein to the accompanying drawings.

This invention relates to a potato sorter or screening apparatus, whereby potatoes can be quickly sorted or separated into different grades or sizes.

The object of the invention is the construction of a simple and efficient apparatus which can be used for separating potatoes of the "Irish" variety, and the same apparatus may be used for other separating purposes such as the sorting of apples or other fruits or vegetables.

With these and other objects in view, my invention comprises certain novel constructions, combinations, and arrangements of parts as will be hereinafter specifically described, illustrated in the accompanying drawings, and more particularly pointed out in the appended claims.

In the drawings:

Figure 2 is a longitudinal sectional view of the apparatus.

Figure 4 is a fragmentary perspective view of the inlet end of the inner casing.

Figure 5 is a fragmentary plan view of a sheet of metal from which the inner casing is constructed.

Figure 1:
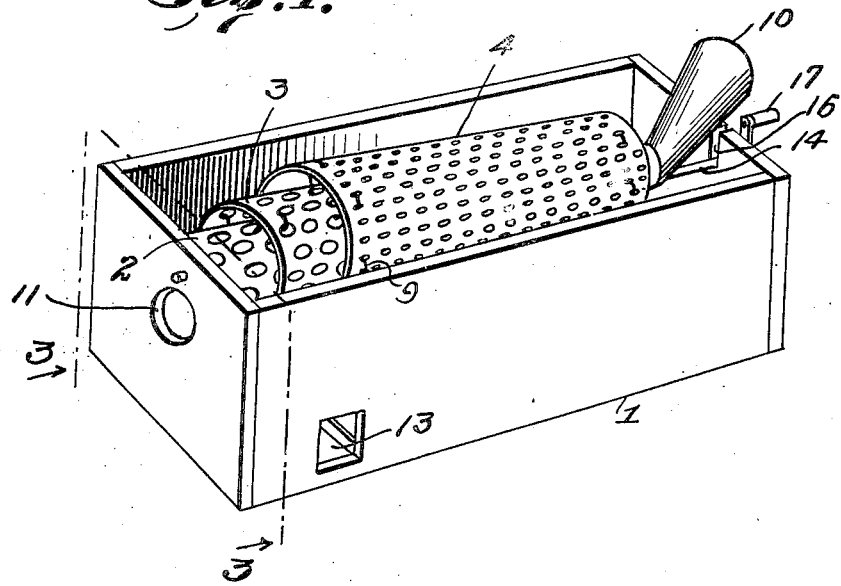
Figure 1 is a perspective view of an apparatus constructed in accordance with the present invention.

Referring to the drawings by numerals, 1 designates the box or container. Within the container 1 is positioned the inner casing 2, the intermediate casing 3, and the outer casing 4. The inner casing 2 is preferably formed from a perforated sheet of metal as shown in Figure 5, the inlet end 5 of which inner casing is notched as at 6, producing the outwardly-flared flanges 7 that constitute anchoring means that lie parallel with the outer face of flange or ring 8; the ring 8 is fastened against the inlet end of the intermediate casing 3.

The three casings are efficiently spaced, one from the other, by means of metallic loops 9; these loops 9 tie or fasten the three sorting cylinders or casings in sufficient spaced relation to allow the vegetables or fruit being sorted to pass between the casings into their respective troughs or outlets.

The inner casing 2 is provided with larger holes or apertures than the other two casings; the intermediate casing is provided with apertures smaller than the apertures in the inner casing, but with apertures larger than the apertures in the outer casing; the apertures in the outer casing are smaller than the apertures in the other two casings so that, for instance, the potatoes placed or poured into the hopper funnel 10 will first be discharged into the inner casing 2, and all of the potatoes that are too large to pass through the holes or apertures of this casing will be discharged out of the discharge outlet 11 (see arrow), whereas the smaller potatoes will drop through the apertures into the intermediate casing 3, and such potatoes as are too large to drop through the apertures in the intermediate casing will be discharged into the intermediate trough 12 (see arrow, Fig. 2), and the smaller potatoes dropping through the apertures in the intermediate casing will fall into the outer casing 4, and thence pass into the trough 13, the apertures in the outer casing being particularly provided to allow dust or dirt to pass down into the container 1, and when the casings are lifted out of the container, the same can be cleaned at the will of the operator.

A shaft 14 is journaled at its outer end 15 in the discharge end of the container 1, while the inner end of the shaft is journaled in a notch 16 formed in the inner end of the container; the handle 17 is fastened to the shaft 14 for rotating the same. By means of spokes 18, the shaft is rigidly fastened within the inner casing, the inner casing being fastened eccentrically to the shaft so that a better agitation of the potatoes or fruit being sorted will be obtainable by the shaking of the contents of the casings as they are rotated by the operator through the medium of the handle 17 of shaft 14. This eccentric positioning of the casings upon the driving shaft 14 causes a shaking or jarring action during the rotation of the casings, thereby more efficiently separating the contents of the casings and facilitating the sorting by allowing the smaller articles to drop through the apertures, whereas hastening the discharge of the larger articles, at the discharge end of the casings, since, when the casings are in their lowest position upon the shaft, shown in Figure 2, the casings will be inclined towards the outlet 11 and the troughs 12 and 13, thereby positively directing the articles or potatoes towards the discharge ends of the casings.

The discharge end 10$^a$ of the hopper funnel 10 is substantially the same size as the inlet end of the inner casing 2, preventing the potatoes from being discharged from its inlet end; the ring 8 closes the inlet or inner end of the intermediate casing 3, and any suitable closure means, as a piece of metal 19 (Fig. 2), can be employed for closing the inner end of the outer casing 4.

Figure 3:
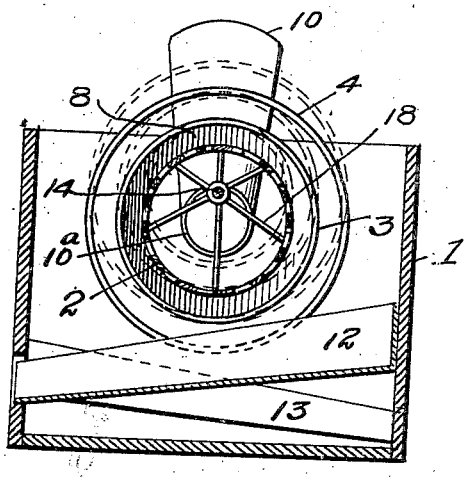
Figure 3 is a sectional view taken on line 3—3, Figure 1, looking in the direction of the arrows.

It is to be understood that the anchoring flanges 7, together with ring 8, will act as a spacing means and support for the inlet or inner ends of the inner and intermediate casings, but I further strengthen this connection by the loops 9, which loops efficiently space and tie the discharge outer ends of the casings, as hereinbefore stated. It is noted that the troughs 12 and 13 (Fig. 3) discharge at opposite ends of the container 1.

Certain minor alterations or changes may appear to one skilled in the art to which this invention relates, which may be found desirable in constructing this apparatus on a large scale, and, therefore, I reserve the right to make such minor alterations or changes in the manufacture of my apparatus as appear to one skilled in the art to which this invention relates, and which shall fairly fall within the scope of the appended claims.

What I claim is:

1. In an apparatus of the class described, the combination with a container, of a shaft journaled upon said container, an inner casing formed of perforated sheet metal positioned around said shaft, said inner casing provided with a notched inner end producing outwardly-flared flanges at an angle to the casing, means fastening said inner casing to said shaft, an intermediate casing surrounding said inner casing, a ring fastened to the inner end of the intermediate casing and engaging the inner casing, said outwardly-flared flanges resting against the outer face of said ring, an outer casing surrounding said intermediate casing, means suitably fastening and spacing all of said casings together, and means for supplying vegetables or fruits to the interior of said inner casing.

2. In an apparatus of the class described, the combination with a container, a shaft journaled upon said container, of a pair of apertured casings spaced one from the other and fixedly supported in an eccentric position upon said shaft, one of said casings provided with supporting flanges, the other casing provided with closure means at one end lying against said flanges, and means at the flanged end of the casing for supplying products to the interior of said casing, to be sorted.

3. In an apparatus of the class described, the combination with a container, a shaft journaled upon said container, of an inner casing fastened to said shaft, said inner casing provided at its inlet end with rigid, inwardly-disposed, spaced flanges, a casing on the outside of said inner casing and provided with means closing its inner end, said closing means resting against one side of said flanges of the inner casing, and a hopper funnel provided with a discharge end extending into the casing and substantially closing the inner end of said inner casing.

4. In an apparatus of the class described, the combination with a container, a shaft journaled upon said container, of a plurality of apertured casings supported upon said shaft, loops connecting and spacing said casings, and means for supplying products to said casings.

5. In an apparatus of the class described, the combination with a container, a shaft journaled upon said container, of apertured casings eccentrically positioned upon and fastened to said shaft, metal loops threaded through some of the apertures of said casings and fastening all of said casings together and spacing the same with respect to each other, and means extending around the shaft and substantially closing the inlet end of one of the casings for supplying products to the casings, to be sorted.

6. In an apparatus of the class described, the combination of a container provided at one end with a notch and at its opposite end with a discharge outlet, oppositely-discharging troughs positioned contiguous to said outlet opening, a shaft journaled at one end in the container above the outlet opening and having its other end resting in the notch, an inner apertured casing extending around said shaft within the container, and discharging through said outlet, spokes fastening the shaft and inner casing together, an intermediate and an outer apertured casing around the inner casing, said intermediate and outer casings each discharging into a separate trough, metal loops threaded through some of the apertures of the casings and evenly spacing the intermediate and outer casings upon and fastening the same to the inner casing, said inner casing provided with separate outwardly-flared flanges positioned at right angles to the casing, a ring fastened to the intermediate casing and resting against the inner faces of the flanges, and a hopper funnel provided with a discharge end closing the inlet end of the inner casing.

In testimony whereof I hereunto affix my signature.

HENRY MADSON.